(12) United States Patent
Suag et al.

(10) Patent No.: US 12,547,935 B1
(45) Date of Patent: Feb. 10, 2026

(54) OPTIMIZING PRODUCT SEARCHES BASED ON COMMUNICATIONS ENGAGEMENT FEEDBACK

(71) Applicant: Blueshift Labs, Inc., San Francisco, CA (US)

(72) Inventors: Anmol Singh Suag, San Francisco, CA (US); Anuraj Pandey, San Francisco, CA (US); Subramanyam Mallela, Albany, CA (US)

(73) Assignee: Blueshift Labs, Inc., San Francisco, CA (US)

( * ) Notice: Subject to any disclaimer, the term of this patent is extended or adjusted under 35 U.S.C. 154(b) by 847 days.

(21) Appl. No.: 17/850,431

(22) Filed: Jun. 27, 2022

(51) Int. Cl.
*G06N 20/00* (2019.01)

(52) U.S. Cl.
CPC .................... *G06N 20/00* (2019.01)

(58) Field of Classification Search
CPC ....................................................... G06N 20/00
See application file for complete search history.

(56) References Cited

U.S. PATENT DOCUMENTS

| | | | |
|---|---|---|---|
| 9,779,443 B1 | 10/2017 | Chittoor | |
| 11,379,874 B1 * | 7/2022 | Mei | G06Q 30/0254 |
| 11,580,099 B2 * | 2/2023 | Chen | G06F 16/9035 |
| 11,580,585 B1 * | 2/2023 | Rajana | G06Q 30/0202 |
| 11,625,644 B1 * | 4/2023 | Haramaty | G06F 16/9535 707/723 |
| 2022/0207506 A1 * | 6/2022 | Daruna | G06Q 20/407 |
| 2023/0128705 A1 * | 4/2023 | Weinberg | G06N 20/00 700/117 |
| 2023/0136886 A1 * | 5/2023 | Ruan | G06Q 30/0631 705/7.31 |
| 2023/0260003 A1 * | 8/2023 | Guo | G06Q 30/0631 705/26.1 |

* cited by examiner

*Primary Examiner* — Tarek Chbouki
(74) *Attorney, Agent, or Firm* — Staniford Tomita LLP

(57) ABSTRACT

Embodiments are described for monitoring a communications medium between a user and one or more other users and one or more products for selection, and collecting data about the users, the one or more products, and historical interactions among the users and the products from the monitored communications medium. Features pertaining to the collected data are defined and selected, and a candidate ranking process is trained using a LambdaMART Learning-to-Rank model based on the defined features. The model is deployed and applied to live data to produce product recommendations for display to the user. The model is retrained using refreshed data based on user behavior evidenced in the live data to update the model for the user behavior.

15 Claims, 8 Drawing Sheets

OPTIMIZING PRODUCT SEARCHES BASED ON COMMUNICATIONS ENGAGEMENT FEEDBACK

TECHNICAL FIELD

Embodiments are generally directed to optimizing candidate ranking models using machine learning processes.

BACKGROUND

Computerized and online search engines for data processing and e-commerce platforms typically access large databases holding vast numbers of data assets that can be organized, referenced, and categorized in many different ways. Beyond simple text or pattern matching algorithms, search engines increasingly use information regarding user characteristics and behavior to try to improve and refine search engine performance in returning appropriate results to user queries. Certain machine learning (ML) and artificial intelligence (AI) techniques have been developed to create models that further refine search engine performance, especially for organizations that process large amounts of user communications data (e.g., e-mail, text messages, web browser history, etc.) pertaining to product and service preferences. Such communications data can provide valuable insights into explicitly stated and implied choices and preferences of users that can greatly help improve search engine performance, not only for specific users but classes or groups of present and future users as well.

Candidate Ranking models have been deployed across various industries to solve different problems ranging from optimizing search results to user feed optimization. However, present systems do not include mechanisms for picking the right features for candidate ranking algorithms to optimize search results and product recommendations in particular marketing spaces. This can be a significant limitation in current e-commerce environments that provide a platform for many different types of markets, vendors, product/service offerings, sales domains, and so on.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

SUMMARY OF EMBODIMENTS

Embodiments are described for a candidate ranking process using a Learning to Rank (LTR) algorithm that selects the features that make the LTR model perform optimally in certain domains for generating product recommendations to users. Such embodiments help select the right features to optimize search results in specific marketing spaces, as opposed to present systems that use the same or generic features for all domains and spaces.

Embodiments are further described for monitoring communications between a user and other users, and interactions between the user and products for selection, to collect data about the users, the products, and historical interactions among the users and the products from the monitored communications. Features pertaining to the collected data are defined and selected, and a candidate ranking process is trained using a Learning-to-Rank (e.g., LambdaMART) model based on the defined features. The model is deployed and applied to live data to produce product recommendations for display to the user. The model is retrained using refreshed data based on user behavior evidenced in the live data to update the model for the user behavior. This retraining feedback loop constantly optimizes ranked recommendations for a user by learning from a user's communication. A candidate ranking algorithm is modeled using a unique set of domain features relevant to marketing and iteratively optimizes itself on every new interaction of the user through the feedback loop

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
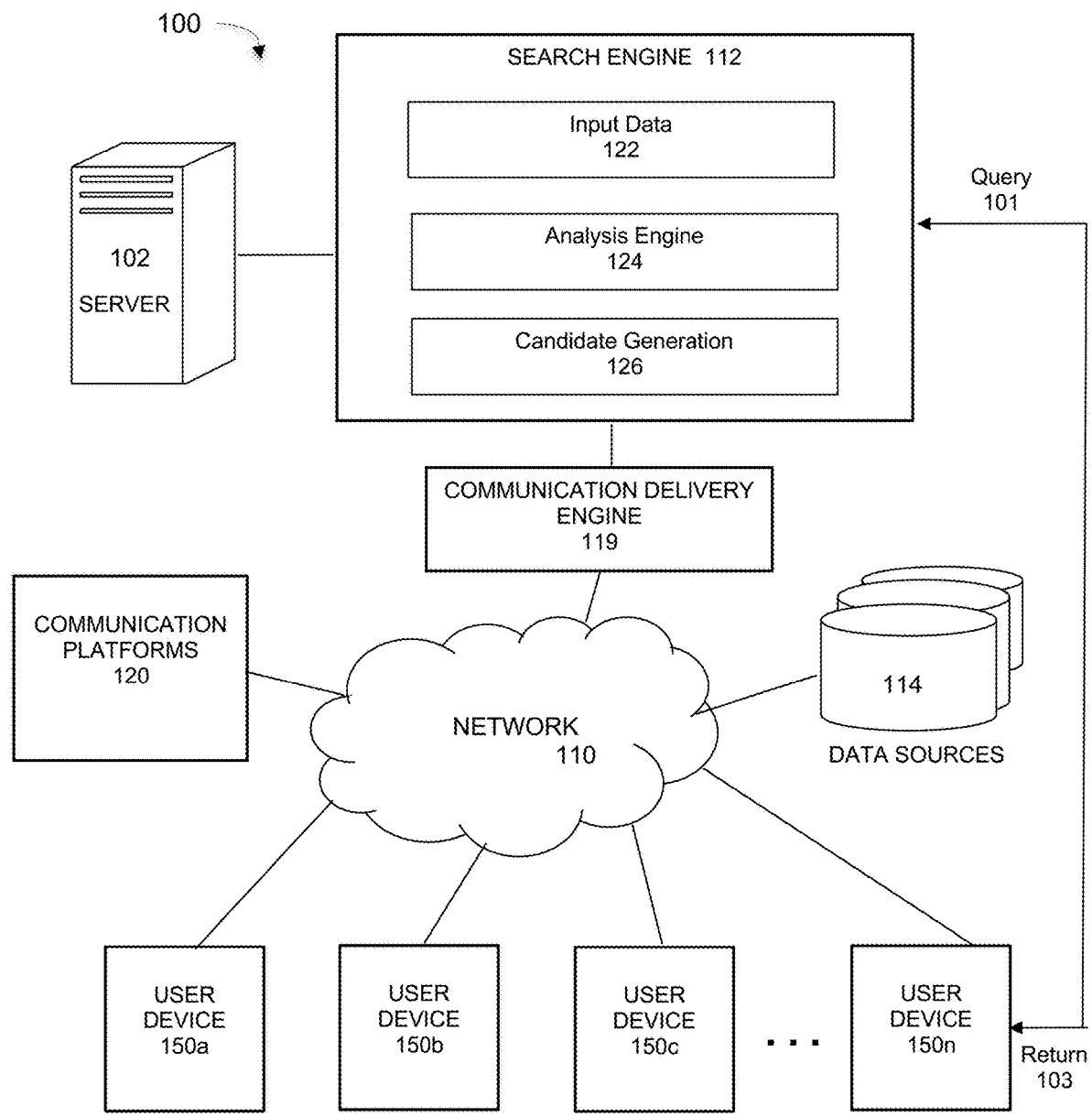
FIG. 1 is a diagram of a computer network system implementing an optimized search engine using candidate ranking models, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium containing computer-readable instructions or computer program code, or as a computer program product having a computer-readable program code embodied therein. In the context of this disclosure, a computer-usable or readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. The computer-readable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the embodiments. Applications may also be downloaded, in whole or in part, through the use of a software development kit or toolkit that enables the creation and implementation of the described embodiments, which may also be referred to as techniques. In general, the order of the steps of disclosed processes may be altered within the scope of the embodiments.

Some embodiments of the invention involve data processing techniques in a distributed system, such as a very large-scale wide area network (WAN), metropolitan area network (MAN), or cloud based network system, however embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a candidate ranking process using a Learning to Rank (LTR) algorithm, such as LambdaMART, that selects the features that make the LTR model perform optimally in certain domains for generating product recommendations to users. Embodiments may be implemented in a data processing system having a web-based search engine for searching large bodies of data in response to user queries. Such queries could be to access certain data assets, search for information, or to look for items or services to buy or acquire, such as through e-commerce platforms.

FIG. 1 is a block diagram of a computer network system implementing an optimized search engine using candidate ranking models, under some embodiments. In system 100, a server computer 102 executes a search engine process 112, which is coupled to user devices 150a-150n over a network 110, where n may be any practical number of devices. The server 102 may communicate with user devices 150a-150n through one or more communication delivery engines, such as using e-mail, text messages, short message service (SMS) messages, or other appropriate communication means or interfaces. The search engine receives queries from users operating respective user devices and accesses data sources 114 to return responsive messages back to the user(s).

The data sourced by system 100 may be stored in any number of other storage locations and devices, such as local client storage, server storage, or network storage, which may at least be partially implemented through storage device arrays. This storage may be supported by product/service vendors, e-commerce platforms, information technology (IT) providers, and so on. The data sources 114 may thus represent any type of online or e-commerce portal, website, platform, or destination maintained by a vendor, manufacturer, promoter, or any other sales or distribution outlet or organization.

Network 110 may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform.

User devices 150a-150n may include personal computers, laptop/notebook computers, tablet computers, smart phones, or any similar computing device that allows a user to access network 110, such as through a web browser program, and input relevant queries to search engine 112.

In system 100, the user devices utilize various communication platforms 120 to access resources in the system and information provided by data sources 114. These platforms could be communication programs, such as e-mail, text, social network sites, and so on, or they may be interfaces to web sites or web portals supported by vendors or e-commerce providers.

In an embodiment, search engine 112 contains or accesses certain data and processes including input data 122 comprising data elements such as user characteristics and resource interaction history, product catalogs, communications content, and so on. This data is processed in analysis engine 124 to process a user query 101.

The search engine 112 represents a processing component that examines a body of data (e.g., one or more large-scale databases) in a systematic way for particular information specified in a textual search query input by a user. The body of data may be World Wide Web content, such that the search engine performs web searches, or it may be any other body of accessible public or private data. The search engine 112 may employ one or more indexing schemes that associate words and other data elements to location or storage information (e.g., associating web pages to their domain names and HTML-based fields). A query from a user can be a single word, multiple words or a sentence, and the index helps find information relating to the query as quickly as possible. A user enters a query into the search engine as one or more keywords, and the index already has the names of the sites or locations containing the keywords, and these are instantly returned in response to the query from the index. If more than one response is returned for a query, they can be ranked in order of most to least relevant to the query based on number or closeness of keyword matches, and so on.

In response to the query to the search engine, a large number of possible data elements may be appropriate to be returned to the user. That is, a single query may return a great many possible results. The user must then manually parse through these results to find what they consider the most relevant result or results. In most cases, and depending upon the quality of the query, many, if not most results would be irrelevant or not properly responsive to the query. To prevent overwhelming the user and wasting system resources, a candidate generation process 126 produces a candidate set that is optimally sized to provide a meaningful response to the user in terms of a minimal return or return set 103.

Figure 2:
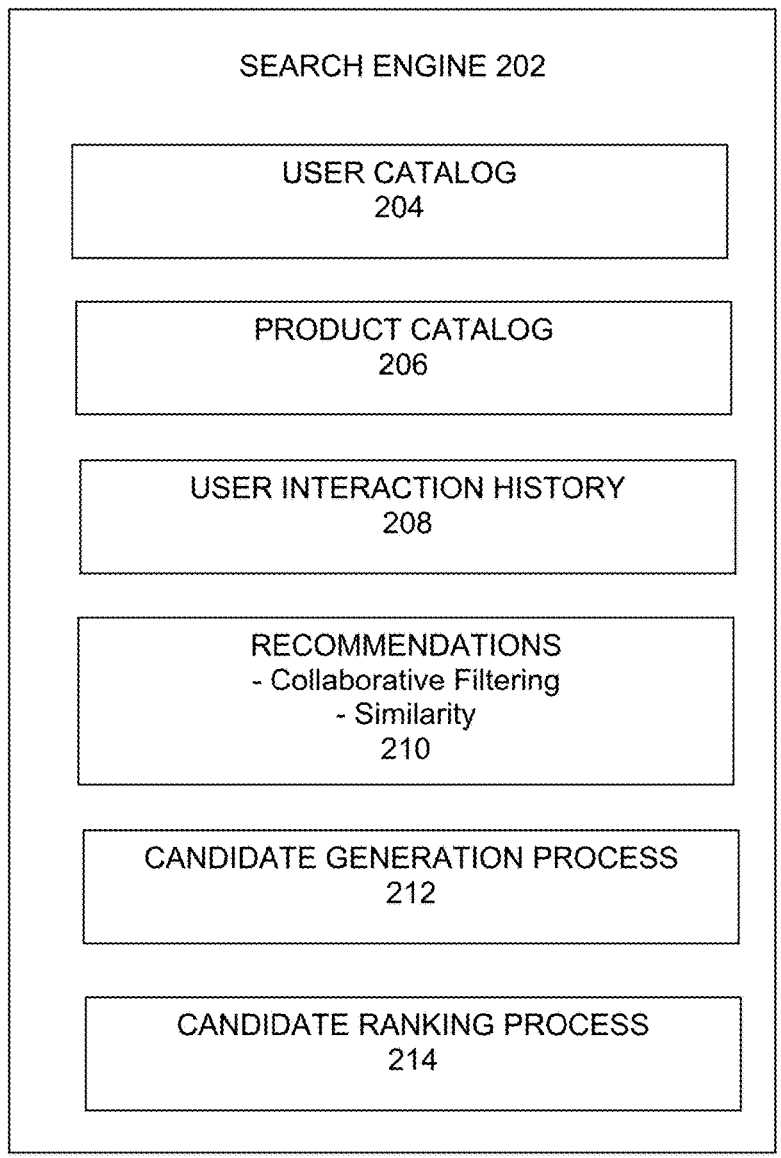
FIG. 2 illustrates a search engine component implementing a candidate generation process, under some embodiments.

FIG. 2 illustrates a search engine component implementing a candidate generation process, under some embodiments. As shown in FIG. 2, the search engine 202, which may correspond at least in part to search engine component 112, includes or accesses a user catalog 204, a product catalog 206, and a history 208 of interactions between the users with other users, and users and products. This data is then processed to generate recommendations 210. Such recommendations could be of various types, such as recommendations based on user's category affinity, a next best product to user's previous activity, popular products in the user's area, or similar products to the user's interacted products, and so on. The recommendation process could use collaborative filtering processes, and find similar products to the user's interacted products using title similarity mechanisms.

The list of products coming out of the recommendation process 210 could be totally different and would vary from user to user based upon his/her activity, location, interests, and so on. These recommendations are then processed by candidate generation process 212 to produce a reduced list of products referred to as 'candidates.' This candidate set is intended to be much smaller than the size of the product catalog. Threshold sizes of candidate sets may be defined through user or system configuration so that the candidate set does not exceed a certain number (e.g., 10 or 20) of candidates.

A candidate ranking process 214 is used to reduce the number of candidates to a more reasonable size. The candidate ranking process 214 organizes the candidates in the candidate set in order of relevance to the user, so that the most relevant responses (products) are displayed to the user with the most relevant products first or on top. Essentially, the process 214 takes an initial ranking of products, such as an initial random ranking, and then applies product and user features, such as collected from user activity over communication media (e.g., website, e-mail, etc.) to re-rank the products until a final ranking is generated. The process involves unique feature engineering to create relevant features for users, products, user-product interactions, and so on. The features are used to train an LTR model which is then used to re-rank the initial previous rankings in the same campaign or later campaigns.

Certain embodiments are described with reference to campaigns, which refer to targeted advertising, marketing, sales or promotional activities that expose users or groups of users to specific products or services through direct or broadcast communications. Such campaigns may include webpage ads, e-mail messages, text or push notifications, and so on. A campaign is a specific rule or set of rules through which a seller or promoter shows products/services to potential buyers. A campaign can be a one-time event, or it may be an ongoing or periodic event.

In an embodiment, the candidate ranking process 214 uses a domain-specific feature engineering and machine learning (ML) model that constantly optimizes the ranked recommendations for a user by learning from a user's communication (e.g., e-mail click) behavior through a feedback loop. A candidate ranking machine learning algorithm is modeled using a unique set of domain features relevant to marketing and that optimizes itself further on every new interaction of the user through the feedback loop.

In an embodiment, the candidate ranking process uses a LambdaMART model to train the candidate ranking algorithm. It should be noted that the present description is described with respect to the LambdaMART model, though embodiments are not so limited; for example, other models, such as Gradient Boosted Trees and Deep Neural Networks may also be used.

Figure 3:
FIG. 3 illustrates a feature selection process that selects features to produce recommendations, under some embodiments.

The candidate ranking process 214 utilizes an advantageous feature selection process that selects features that make the LambdaMART model perform well on a marketing domain for recommendation optimization. FIG. 3 illustrates a feature selection process 302 that selects features for the candidate ranking process 304 to produce recommendations 306 based on returned search results. This feature selection process 302 selects the right features for the candidate ranking algorithm to optimize search engine results product recommendations in a marketing space. The model learns through user feedback, which is then turned into features for testing and future searches.

LambdaMART is a type of Learning-to-Rank (LTR) algorithmic technique to solve ranking problems in search relevancy. In general, LTR is a group of three main techniques that apply supervised machine learning algorithms to solve various ranking problems, such as in search engine ranking. LTR performs the act of ranking a list's items and determining an optimal order for those items. Unlike traditional ML techniques that solve a prediction problem on a single instance in time, LTR solves a ranking problem on a list of items to derive an optimal ordering of those items. As such, LTR is more concerned with the relative ordering among all the items, rather than the exact score of each item.

LambdaMART is a technique where a ranking is transformed into a pairwise classification or regression problem. The algorithms consider a pair of items at a single time and derive a viable ordering of those items before initiating the final order of the entire list. LambdaMART is a combination of LambdaRank (based on RankNet) and MART (Multiple Additive Regression Trees), where MART uses gradient boosted decision trees for prediction tasks. LambdaMART improves this by using gradient boosted decision trees with a cost function derived from LambdaRank to order any ranking situation.

As described above, the LambdaMART is used to rank candidates in order of most relevant to least relevant within a candidate set formed using certain user and product data. Given a user catalog, a product catalog and a history of interactions between the users and products, the candidate generation process 126 creates various types of recommendations for a particular user, such as a list of products coming out of different recommendation algorithms (which could be totally different and would vary from user to user based upon his/her activity, location, interests, etc.). Once the entire number of possible candidates is pared down to a smaller candidate set, the LambdaMART process is used to order the candidates in descending degree of relevance.

Figure 4:
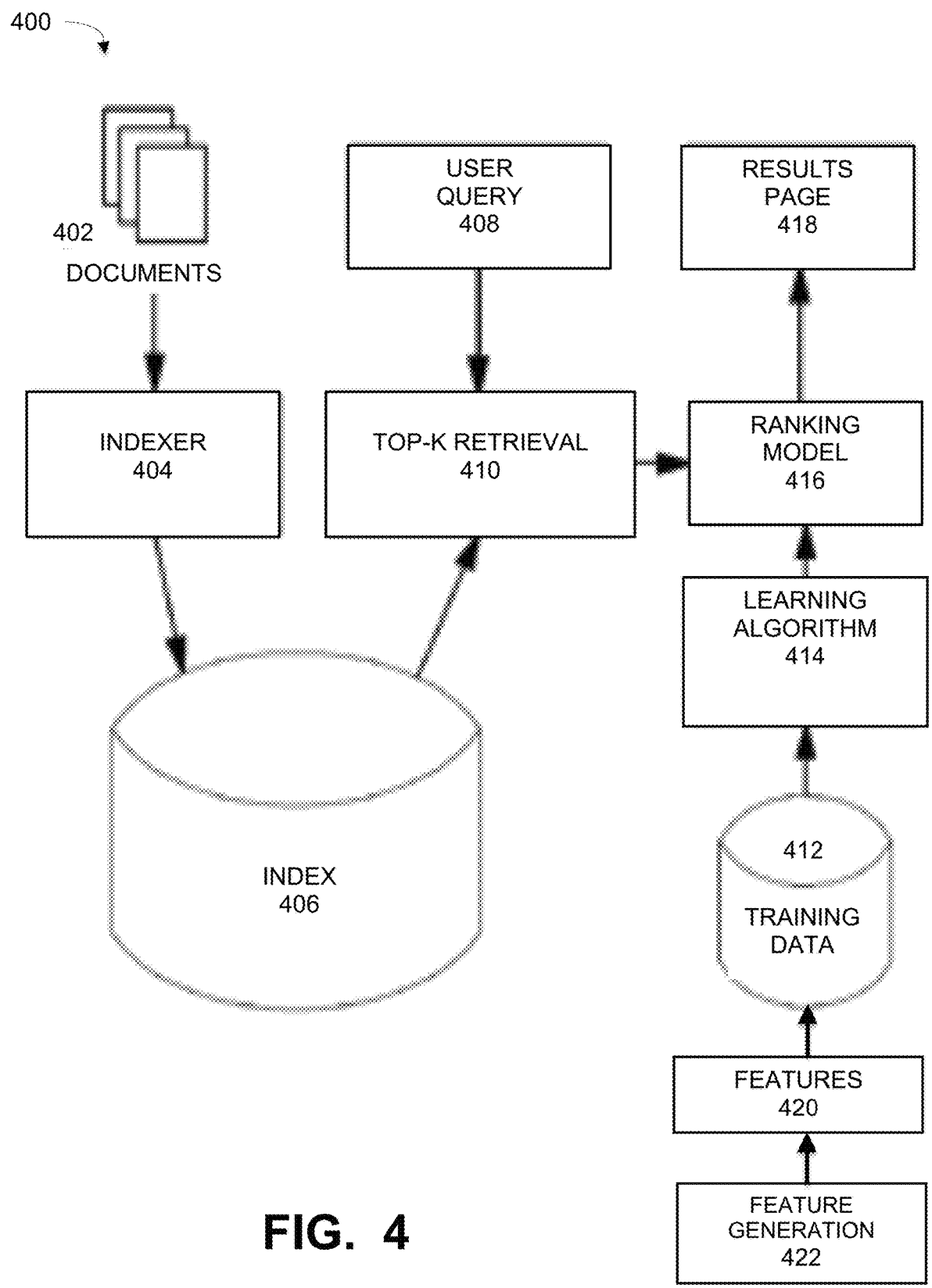
FIG. 4 illustrates an Learning-to-Rank (LTR) system implementing a feature set optimized by a feedback loop, under some embodiments.

FIG. 4 illustrates an LTR system implementing a feature set optimized by a feedback loop, under some embodiments. As shown in FIG. 4, the corpus of data to be searched on comprises documents 402 indexed by an indexer 404 and stored in an index datastore 406. The raw data 402 is shown to be documents, but can be any relevant data element or file, such as text, images, resource links, and so on, in any appropriate searchable format in native application format or equivalent. The index 406 is searched upon receipt of a user query 408, and a number (k) of responsive data assets (indexes) 410 are returned. The number (k) of retrieved items can be defined by a default system parameter, or it can be configurable by the user, system, or search engine. The retrieved items 410 are then ranked using a ranking model 416 and then displayed in descending order of relevancy through a GUI-generated results page 418. The results page can display the ranked k items in numbered list form, tabular form, streaming form, or any appropriate representation that evidences the relative order of relevancy of the results.

In an embodiment, the ranking model 416 is generated or refined using a learning algorithm 414 based on training data 412. The training data for an LTR model consists of a list of results for a query 408 and a relevance rating for each of those finite number of results (top-k retrieved results) 410 with respect to the query. Once the system has a dataset with query (such as a user context), the list of documents (or products, etc.) recommended to the user and relevance scores, the model can be trained. In an embodiment, the relevance scores may be given as an arithmetic or scalar value along a defined scale (e.g., 1-10 low to high), or it can be a binary score, such as indicating whether or not the user selected (clicked on) a product.

In general, there are three variations of an LTR algorithm: Point-wise, Pair-wise, and List-wise. Point-wise techniques use classification or regression to learn to score one document (product) at a time and a trained model could be used to score products given a query (user context). Pair-wise techniques like RankNet, Bayesian Personalized Ranking, and LambdaRank, etc., work on two documents (products) at a time and learn a scoring function to rank one over the other. List-wise algorithms like ListNet or LambdaRank, decide on the optimal ordering of an entire list of documents. Although embodiments are described with respect to LambdaRank and LambdaMART, it should be noted that embodiments of system 400 may use any appropriate LTR method, depending on system configuration.

As shown in FIG. 4, the training data 412 is derived using certain features 420 generated by a feature generation process 422. In machine learning, a feature is an individual measurable property or characteristic. Features used to train the model can be of many different types, including textual, numerical time-series, audio, image, video, and other related media formats. A model is trained using features that include, but are not limited to: recency, frequency and magnitude (RFM) of user attributes, product attributes, and historical user-to-product interactions. These interactions can be events on a client's application, website, e-mail, notification or any other campaigns, and such interactions can be views, clicks, opens, adds-to-cart, favorites, and so on. User attributes such as demography, location, age, device, historical activity are also used as features. Likewise, product attributes like title, description, price, category, brand, rating, image can also be used as features. Some RFM features can be computed dynamically (on the fly), while other complicated textual/audio/video features are pre-computed through Natural Language Processing, and other machine learning algorithms like Alternating Least Squares (ALS), and so on.

Figure 5:
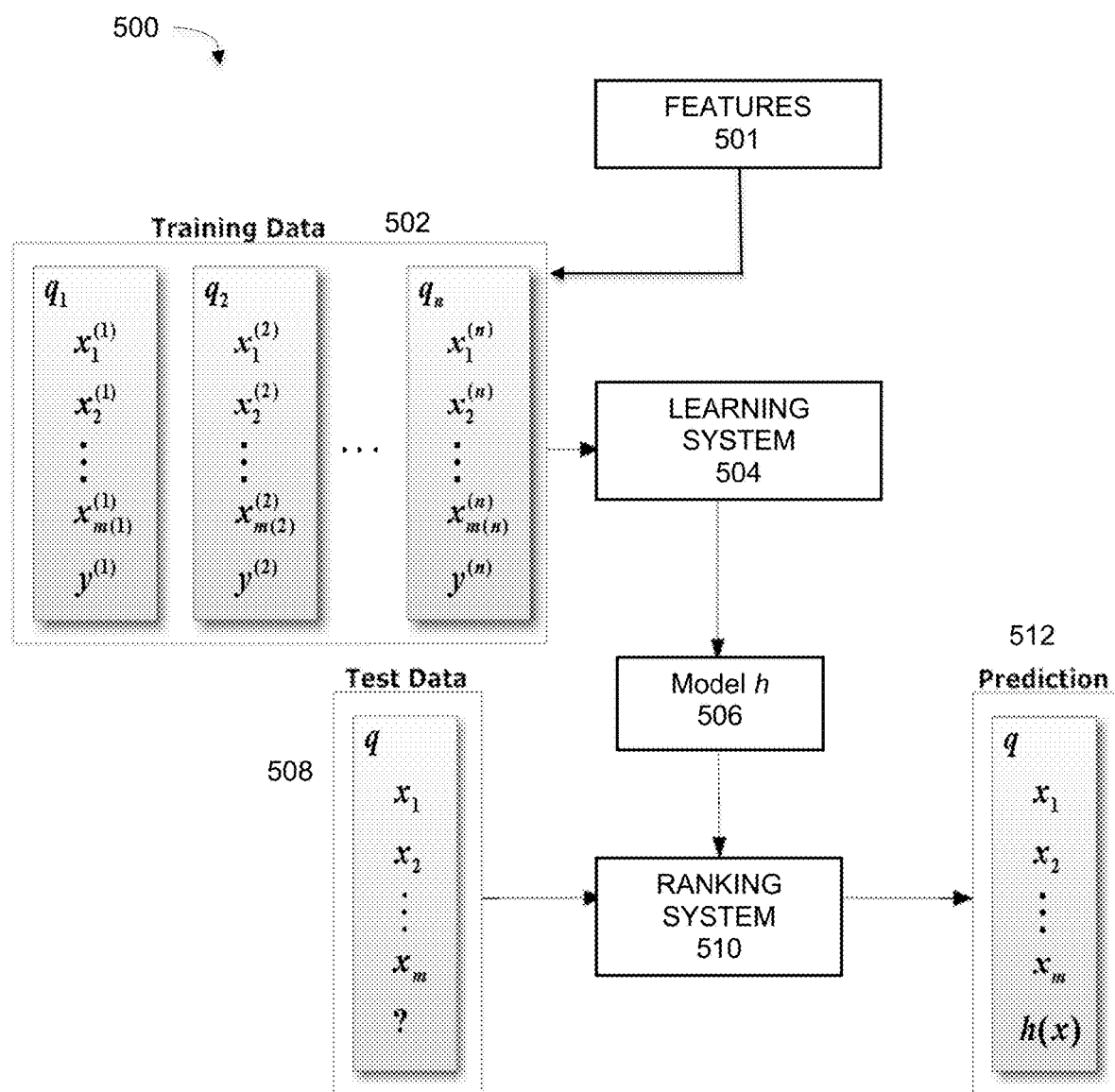
FIG. 5 illustrates the operation of an LTR model to generate predictions, under some embodiments.

FIG. 5 illustrates the operation of an LTR model to generate predictions, under some embodiments. As shown in FIG. 5, system or process 500 uses a learning system 504 to process training data 502 to generate a model 506. This model is then applied to a ranking system 510, which processes test data 508 to produce predictions or recommendations 512 as a ranked list of items. As described above, the model 506 is trained using RFM features of user attributes, product attributes, and historical user-to-product interactions, among other possible characteristics and interactions.

Figure 6:
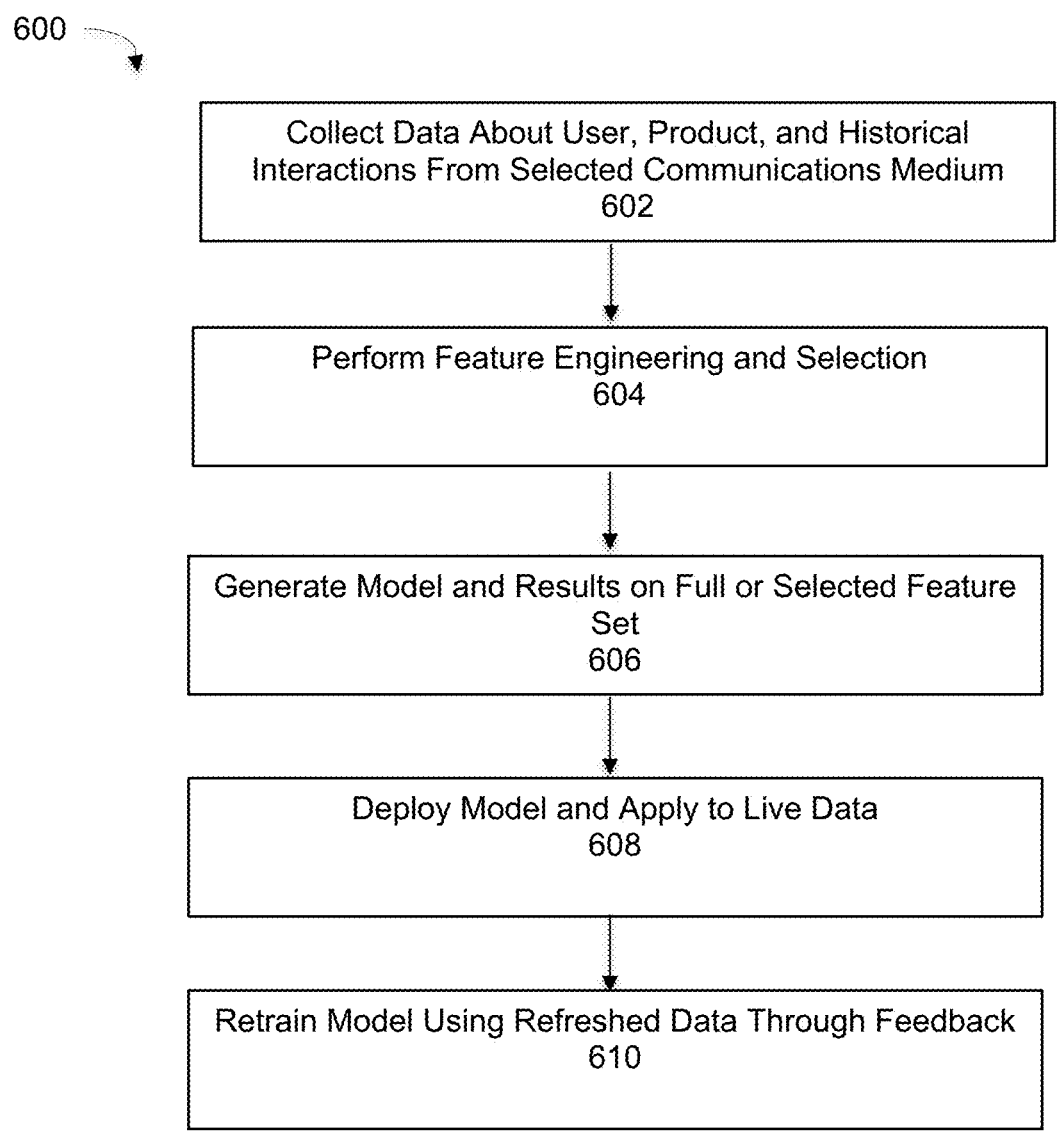
FIG. 6 is a flowchart that illustrates an overall method of generating product recommendations using feature processing, under some embodiments.

FIG. 6 is a flowchart that illustrates an overall method of generating product recommendations using feature processing, under some embodiments. As shown in FIG. 6, process 600 begins by collecting data about users, products, and historical interactions from the selected communication medium, such as e-mails, text messages, website visits, and so on. Initially, without a trained model, the product recommendations sent to users via e-mail, website, app notifications, and so on, are randomized. The list of products sent to the user via these communications channels is maintained along with their relative position (e.g., display order in a ranked set of choices). Events related to user activity on these products are tracked for a specific time. For example, user interactions on the product, if any, are usually received within 72 hours of the campaign launch. Positive user interactions like clicks, selections, likes, favorites, and so on, on a recommended product are considered as a positive data point for the model training. Conversely, interactions like an open that does not result in a click or other selection or affirmation event are considered as negative data points for model training. As the conversion rate of campaigns is low and only few users end up opening/interacting with the recommended products, down-sampling is performed on negative data points. Users sometimes perform multiple positive interactions on a products so only unique interactions are considered to prevent any skewing of the data. Likewise, users who do not even open the email/notifications are not considered for model training.

After the relevant data is collected, the process performs feature engineering and selection, 604. As shown in FIG. 4, features 420 are used to produce the training data 412. In an embodiment, the feature generation process 422 implements a feature engineering and selection process to generate features appropriate for a certain searchable dataset 406, application, or other context prompting the user queries.

In the context of an e-commerce platform in which the search engine provides relevant recommendation of products or services to a user based on a query, many different features may be defined to cover user characteristics (e.g., age, gender, location, etc.), product characteristics (e.g., price, popularity, availability, etc.), trends, social behavior and so on.

In an embodiment, the feature engineering process builds the features using communication messages processed by a set of users. For an example case of returning search results and recommending products through e-mail message solicitation, data from an e-mail campaign sent to a significant number of test users can be compiled and analyzed to generate a model for recommending products to later users. The system can collect selection (i.e., open/click) data for the users who opened an email from the campaign. The system can then assemble a preliminary dataset that contains: user_uuid, product_uuid, campaign_id and select/no-select, or other similar data. It is assumed that selections are an explicit (clean and actionable) ground truth for learning a model to rank.

Table 1 below illustrates example data for feature engineering, under this example embodiment.

TABLE 1

| user_uuid | product_uuid | campaign_uuid | select |
|---|---|---|---|
| U1 | P1 | C1 | 0 |
| U1 | P2 | C1 | 1 |
| U2 | P1 | C1 | 0 |

This data comprises selection actions by two users (U1 and U2) for two different products (P1 and P2) solicited in one campaign (C1). Table 1 is provided for purposes of illustration only, and other data types and elements are also possible. For this example, three campaigns are used to derive data and are treated separately for feature engineering as the process looks back 180 days from campaign launch date to collect features for users and products.

For this example, the user_uuid and product_uuid may be dropped or replaced with other features so that the model can produce results on users and products that have not previously been considered. Other post-engineering processes can also be applied, such as feature scaling and downsampling to reduce the overall dataset to a manageable size, depending on system constraints.

In the e-commerce world, where users are constantly interacting with products across a client's website, application, or other marketing campaigns, the feature engineering and selection plays a vital role in training any machine learning algorithm. In the marketing setting, the an example group of eight features that can be engineered (in step 604) for the users and products in the preliminary dataset using different sources could include following:

1. User Catalog Features: RFM of User's country, region, tags followed, brands followed, site-age, gender, etc.
2. User Timeline Features: User's activity count, unique days, last visit, category interactions, etc.
3. User Campaign Features: User's historic click rate, open count, last click time-difference, etc.
4. Product Catalog Features: Product's category, site-age, tags, brand, 50D Alternative Least Squares (ALS) embeddings, etc.
5. Product Timeline Features: Product popularity, trend, category's popularity, brand's popularity, etc.
6. Product Campaign Features: Product's historic click rate, recommended count, etc.
7. User-Product Features: Recency/Frequency/Magnitude (RFM) of a user's interactions with the recommended product, or its category, etc.
8. Computed Features: User context embedding found by averaging product ALS embeddings over different time frames in last 180 days and its cosine with recommended product embedding, etc.

These eight groups of features that any machine learning algorithm can utilize for learning an objective.

The User Catalog Features include features such as user's country, city, neighborhood, zip code, gender, age, product preferences, operating system and device information, and are used as-is from the client provided user catalog. Subsets of these features may be used depending on availability of data provided by the client.

The User Timeline Features include data provided by constantly tracking user activity on client's website or app using various funnel and goal events such as views, clicks, add-to-carts, purchases, etc. Funnel and goal events may vary from client to client. For example, a purchase could be a goal event for a retail client, whereas a video-completion could be a goal event for a media client. More user specific features are computed by analyzing the user's historical activity events on the client's website or app. These features are the RFM (recency, frequency and magnitude) of funnel and goal events by the user at a side-wide level during the past n-day window (e.g., 1, 3, 14, 31, 91 or 180 day windows). These computed features are able to encode information such as the user's activity count, user activity trends, days since last event, etc.

The User Campaign Features include data provided by constantly tracking user activity on marketing campaigns executed by the client by monitoring open and click events. More user specific features are computed using the RFM (recency, frequency and magnitude) of user's clicks and open on marketing campaigns during the past n-day window. These computed features are able to encode information such as the user's historic click rate, open rate, days since last click, etc.

The Product Catalog Features include information such as product category, brand, tags, rating, quality score, price, launch date, expiry date, location of availability, shipping cost, etc. This data is used as is from the client provided product catalog. A product's title and other textual information is encoded using Natural Language Processing algorithm into a 50-dimensional (or similar) embedding to represent the semantic information. Audio-visual components of an item may also be encoded into embeddings using appropriate encoding algorithms. A subset of product features may be used depending on the availability of data from the client.

The Product Timeline Features capture the RFM (Recency, Frequency and Magnitude) of funnel and goal events on a product across the entirety of a client's user-base during the past n-day windows. These computed features capture the popularity, trends, days since last interaction of the product, its category and other product attributes.

The Product Campaign Features capture the volume of sends, opens and clicks that a product receives during a client's marketing campaigns. These computed features encode information about a product's historic open rate, click rate, campaign popularity etc.

The User-Product Features captures information related to the fact that a user may have interacted with the recommended product or similar product in the past. A user that has already interacted with a product previously might want to interact with it again or might be interested in similar products. Similarly, some users may get fatigued after interacting with a product and do not want to view it again until sometime later. User-Product features are the features that capture the RFM (recency, frequency magnitude) of interactions of a user with a candidate product and its attributes in the past n-day windows. These features encode information about re-purchase behavior, fatigue, user's affinity towards the product's brand, category and other product attributes.

The User Context defines the current state of mind of a user and is an important feature that dictates future user behavior. Embodiments use ALS (Alternating Least Squares), which is a collaborative filtering machine learning algorithm to analyze historic user-product activities across the client for all users and products to computed embeddings for all users and products. A user's context is captured by taking a weighted average of product embeddings that a user has interacted with in the past n days (e.g., 1, 3, 14, 31, 91 or 180 days). This user context embedding is then used to estimate likeability of a product for a given user by taking the cosine distance between the user context embedding and product embedding. The cosine distance is used as an input feature for model training.

In an embodiment, the RFM (Recency, Frequency and Magnitude) features are extracted from a timeline of user-product interactions. Recency is the time of the user's first and last interaction. Frequency is the rate of user interactions in the time-frame. Magnitude is the weight or impact of user interactions. RFM features are computed at daily, weekly or monthly timelines, such as 3, 7, 14, 31, 91 and 180 day (or similar) historic windows.

The ALS (Alternating Least Squares) features are used on a matrix of user-product historical interactions to compute latent features for all users and products. These latent features are embeddings of 50 (or similar) dimensions that can be used to represent a product in a multidimensional space. The cosine distance between embedding vectors of products estimates the similarity between them. A weighted average of all product embeddings interacted by the user in a time-frame can be used to estimate the user context. The cosine distance of this user-context embedding and a product embedding is used as a feature to train the model.

The eight categories of features described above are a holistic view of available features in a marketing setting. A machine learning algorithm can use a subset of these features to train a model, given a training objective. A subset of these features in may be enough to train a simpler model, but the categorization of features is still valid and resourceful. The listed features are provided for example only, and any other relevant feature set may be used. Chosen raw features are further processed by data normalization, outlier removal and substituting erroneous/missing values with the mean value of a feature where necessary. Some machine learning algorithms can also handle missing values, in which case data substitution for missing values may not be needed.

After feature engineering, process 600 trains a model based on the full feature set or on a partial (selected) feature set, 606.

With respect to the model generation, 606, a model must be generated that is capable of re-ranking a set of candidates given a user and features. One of several types of models can be implemented, such as XGBoost or Neural Networks, or even a simple Logistic Regression. To accommodate missing values, embodiments use an XGBoost type model, which treats missing values as another type of information that it uses to branch a tree, to train a model for learning to rank. Other embodiments may use other techniques to generate a ranked list of products for a user from implicit feedback. For example, Matrix Factorization techniques like Bayesian Personalized Ranking work on a matrix of users and products with a pair-wise learning approach.

With respect to model training 606 for the full feature set case, the feature dataset is split into training, validation and testing frames using a random sampling approach, such as 80/20, or similar.

In an embodiment, the model training is a two-step process in which a classification model is initially trained using the training objective binary: logistic through a gradient boosted machine algorithm. This classification model is trained on the full available features engineered as described in the eight feature groups above. A model trained on more features is usually more accurate, but also takes more time for inference. In certain cases, it may be worthwhile to reduce the number of features used to train a model by also preserving accuracy of the model by removing less important or correlated features. The important features can be estimated by using a SHAP (SHapley Additive explanations) process, or similar.

As stated above, in certain cases the full feature set may be overly large. Since a goal is to have the modeling and scoring processes execute as quickly as possible, it is beneficial to do some feature selection. A smaller set of features requires a smaller feature store, faster training and scoring. Therefore, in an embodiment, a feature selection process is performed to select a defined number (e.g., the top 25 most important features) of features which have a high influence on the model. In an embodiment, this feature selection is done using SHAP processes, which is a game theoretic approach to explain the output of any machine learning model.

In an example embodiment, the SHAP process can be used to prune or cut unimportant features and re-train a model using a subset of features that results in a faster and more lightweight model without much impact to the initial model's accuracy. After a full model is trained using all the features, feature importance is computed for each of the used features, and less important features are dropped. In general, a trained model with more features takes more time when used from predictions. Not all features contribute to the predictive power of the model and can be eliminated to reduce model complexity while having little effect on model performance.

In an embodiment, multiple full-model trainings and experimentation of feature pruning on the eight features using SHAP was performed. Thereafter, the experiments revealed that for a marketing setting, the important features could be put into the certain logical groups that each may contain a subset of features from more than one of the above eight groupings. In an embodiment, these logical groups include (1) relevance of recommendation, (2) user activity, (3) product quality, (4) product attribute affinity, and (5) product fatigue.

With respect to relevance of recommendation, it was found that many features in the top important features are the ones that capture a product's relevance to the user. Some of these features are the user context features, such as cosine similarity of user-context embedding and product embedding over the past 91 and 60 days (depicted as cosine_91, cosine_60 in FIG. 7), max cosine similarity of any of last 10 products the user interacted (depicted as cosine_last_10_max in FIG. 7) with and the recommended product, cosine similarity of last product interacted by user and recommended product (cosine_latest), etc. Some User Catalog Features about a user's preferences may also be important, such as if the user follows the candidate product's brand (user_follows_brand in FIG. 7) and if the user follows the candidate product's tags (user_follows_product_tags_count in FIG. 7).

With respect to user activity, many features in the top important features by SHAP analysis of a full-feature trained model are the ones that capture information about a user's past activity on the client's website or campaigns. These features are user's historic click rate (user_click_rate), days since last user activity (user_last_click_days_ago), days since first user activity (user_days_ago_min_180), age of user on client's website (user_age), number of unique days the user has been active in last 180 days (user_unique_days_180), etc.

With respect to product quality, many of the top important features are the ones that capture the quality of a product. Usually the quality of a product can be estimated by its popularity or it's attributes popularity. Some of the features that capture product's quality and also have been found important are popularity of product (product_popularity), popularity of product's category (product_category_popularity) and brand (product_brand_popularity), product's age (product_age) and if the product is being promoted by the client (product_is_promoted).

With respect to product attribute affinity, a user may have an affinity towards a certain attribute of the product like its category, brand or tags. This is proved by analyzing the top important features from SHAP analysis. Some of these features are a count of historic user-category and interactions (user_category_count), count of unique days a user interacted with a product's category (user_brand_unique_days), or recency of interaction with the product's category and brand (user_category_days_ago_min, user_brand_days_ago_min).

With respect to product fatigue, a user may re-interact with an item only after a few days after interacting once. This time during which a user is not interested in a given product anymore is called 'fatigue.' A user may want to revisit a product for re-purchase or re-watch a video or ad later and the feature importance via SHAP shows that these features are quite important in predicting the likeability of product by a user. Product fatigue can be captured by features like count of historic user-product interactions (user_product_count), unique days when user interacted with the product (user_product_unique_days) and recency of user-product interactions (user_product_days_ago_min).

A model is then retrained on this smaller subset of important features (i.e., the five parameters above) and is used in production for faster prediction throughput. With respect to model training for the partial feature set case chosen via feature selection as defined above, a smaller model is trained using about 25% (for example) features. The process now trains a LambdaMART model using the loss function as rank: pairwise. The LambdaMART model learns to rank a product higher or lower for a given user by analyzing the input features for the given user-product pair. There are various hyper-parameters involved in training the model such as learning rate, depth, data sampling, regularization, etc. The optimal values of these hyper-parameters are found via a grid search over a list of candidate values. A best of parameters process is used to train the final model.

Certain feature analysis processes may also be applied to modify the model based on expected or unexpected results. For example, the above features for the dataset can be analyzed to accommodate the fact that users with historically high click rates are more likely to select a product in an e-mail solicitation, or that users who are more active within the last 30 days are more likely to select a product, and so on. Such correlations can be used to further train to the model based on differences or similarities in feature distributions.

In an embodiment, certain SHAP factors can be used to determine a feature's impact on the model output magnitude. In general, the SHAP feature importance process is used to choose the top important features from the full-feature trained classification model in and can be again used on the partial-feature trained LambdaMART model in to visualize the relative importance of the features of the subset used. The feature pruning/selection process is not repeated after the partial-model is trained, but SHAP can still be used to understand the feature importance of the feature subset.

Figure 7:
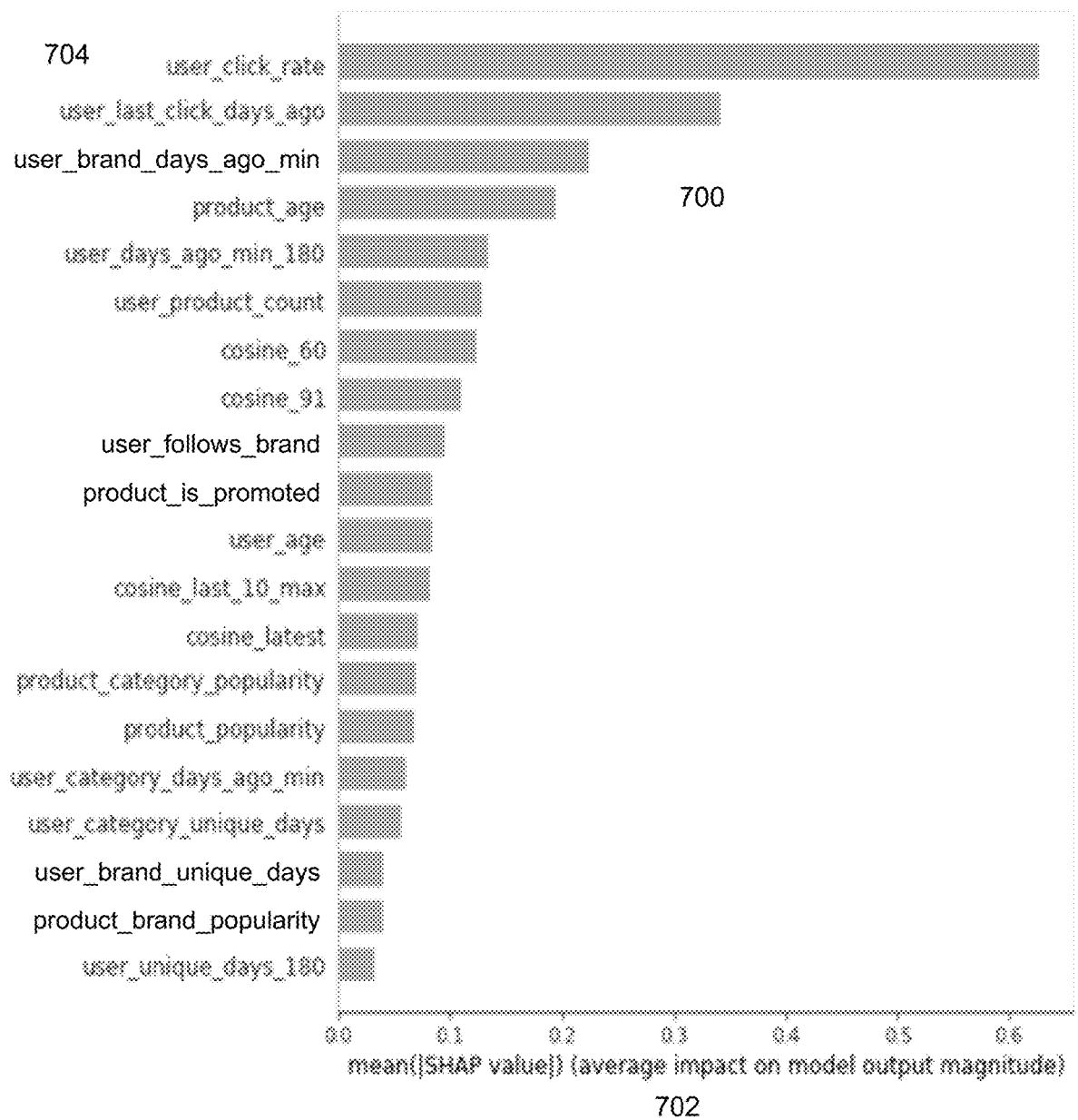
FIG. 7 illustrates an impact on model output magnitude for some example features, under an embodiment.

FIG. 7 illustrates an impact on model output magnitude 702 for some example features 704, under an embodiment. For this example, the plots 700 can be interpreted as the user_click_rate on an average changes the model's output for a given row by 0.6 points (SHAP) from the base score, product_age on an average changes the model's output for a given row by 0.2 points from base score, and so on, for the other features 704.

Similar analysis can be performed to plot the relation between a feature's value and the magnitude by which it affects the model's output (SHAP). For example, a plot can show that a higher value of cosine_91 has a positive SHAP, a higher value of user_product_unique_days has a more negative SHAP, and so on. Similarly, SHAP values for a given row can be plotted to visualize how a feature values influenced the model's output. Partial dependency plots for various features can also be drawn to visualize how the feature values affect the SHAP values. For example, as the cosine similarity of user-context for 91 days and recommended product increases, the SHAP becomes more positive.

Explaining the model with SHAP can provide some degree of confidence on the efficacy of the model as any plotted visualizations are in line with any intuitive understanding on user behavior.

In an embodiment, model errors are analyzed to further refine the model. The SHAP data can be used to visualize each feature to discover misclassifications or other errors, that may have an impact on the model. For example, a misclassification may result in a recently active user with no history of interacting with the recommended product and decent cosine relevance did not select the product.

With reference back to FIG. 6, once the model is generated, it is deployed and applied to live data, 608. This can be done in any appropriate manner for a given application or user scenario. A trained model can now be used to order/re-rank a list of candidate products for a given user. The inference process used the same subset of features used for training the partial-model for a user and list of products. The output of the model is an ordered list of products with more relevant products re-ranked to higher priorities.

After deployment, the candidate re-ranking models are re-trained on refreshed data to incorporate recent user behavior. The feedback loop is used to train the models periodically per a defined schedule or period (e.g., once a day) to keep the models optimized for recent user behavior. As the model is used to deliver optimized recommendations to the users, user activity on these recommendations is monitored and collected. This user activity is then used again as features for the model's next training operation. Therefore, the model uses a feedback loop to re-use recent user activity to re-train itself at a regular cadence to adapt to changing user behavior and bigger datasets.

In an embodiment, the feedback loop for training and using the model for inference works on the concept of explore and exploit. Initially, when there is no historic data available for a campaign and hence there is no trained model available, the campaign randomizes the candidate products for a user and sends them. That is, the process is in 100% explore mode and 100% of the users are sent randomized order of their candidate products. Once interactions of the users are captured and a model is trained as defined in process 600, the system enters into an exploit mode for subsequent campaigns. In the exploit mode, 80% (for example) users are sent recommendations that have been reordered by the trained model, and 20% are still sent randomized recommendations (i.e., 80% exploit and 20% explore mode). The data collected back from the user in explore mode is then used to re-train a model in the next iteration. The choice of which user to explore and which to exploit is random. The explore-exploit percentages are decided by the accuracy of a trained model. For example, a model that is already sufficiently accurate would not need to explore too much in subsequent campaigns, whereas a model that is poorly accurate will still need to have a higher explore percentage in subsequent campaigns to collect more data to train on. The explore-exploit percentage is programmatically decided as a function of last model's training accuracy.

Figure 8:
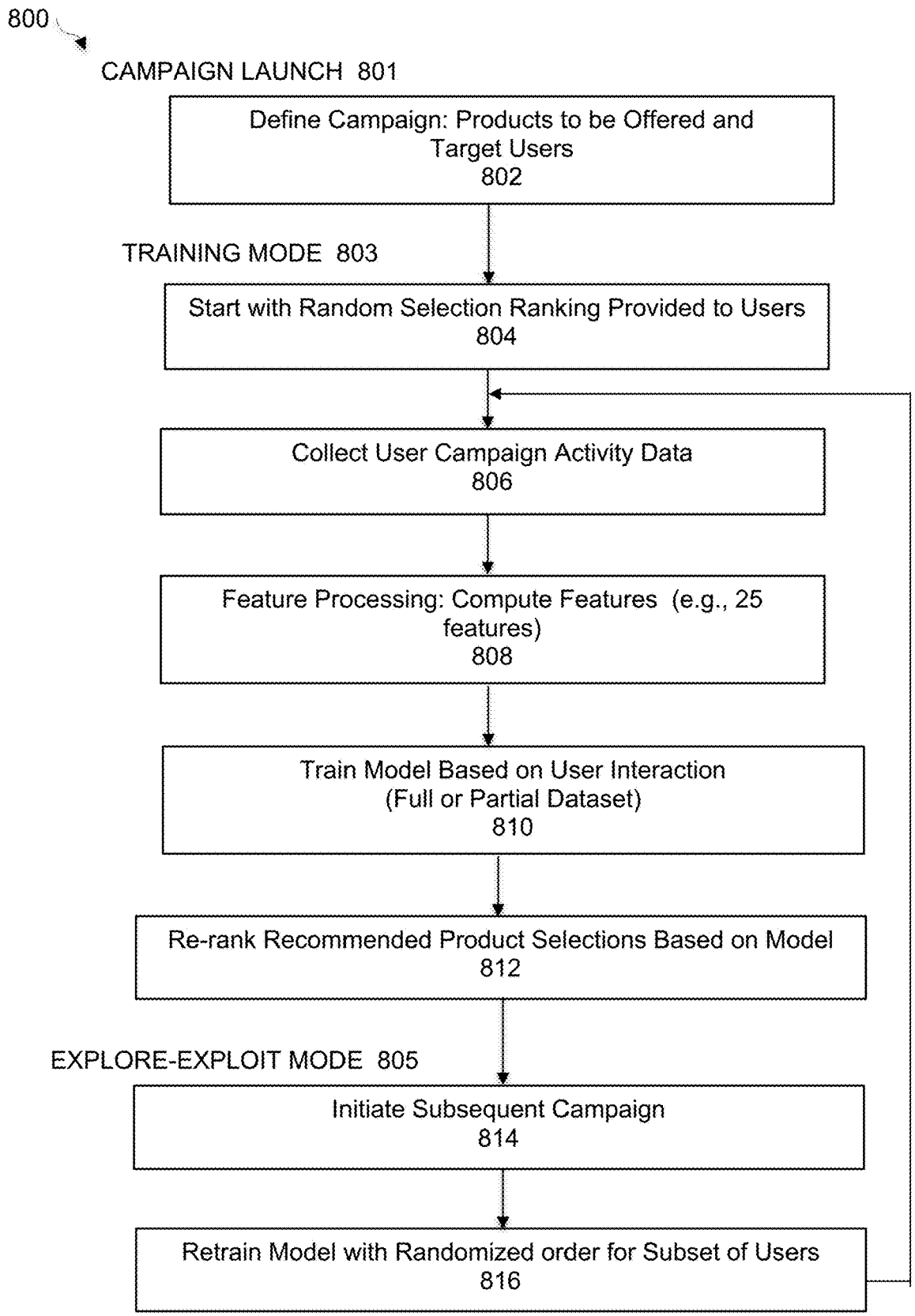
FIG. 8 is a flowchart that illustrates the use of a model training and deployment process in the context of a marketing campaign, under some embodiments.

FIG. 8 is a flowchart that illustrates the use of a model training and deployment process in the context of a marketing campaign, under some embodiments. The process of FIG. 8 illustrates a complete feedback loop that allows a model to fine-tune itself over subsequent campaign runs for a client and adapt to changing user preferences over time. Process 800 starts by defining the campaign, which includes the products and/or services for sale or on offer, and the targeted users or user groups. For example, a Sunday sale campaign may involve sending e-mail messages to five million users each Sunday morning. The first time the campaign is being run, there is no prior trained model or historical campaign data. In this case, during the campaign launch phase 801, the system randomizes the candidate product list and sends it to all users in a campaign. The system logs what exactly was sent and at what time. This product list comprises valid recommendation candidates, but initially when there is no trained model, 100% users are sent randomized products (100% exploration phase).

The process enters a training mode 803 in which an initial or random ranking or order of the products is provided to a user or users, 804. For example, if the campaign is for sporting goods, an initial e-mail message may list items such as tennis racquets, baseball bats, basketball shoes, fishing gear, and so on. Once the campaign has been launched, users will interact with the email/website/notification, and the system collects this user activity data for a set period of time, e.g., for 72 hours after campaign launch, 806. Thus, after the data collection step, the system creates the dataset for model training using: User_Id, product_Id, campaign_id and action {positive/negative}. This step is where the Table 1 (above) data is collected by the system.

The process 800 also includes a feature processing step 808. In this operation, the system creates features for the user, the product, and the user-product interaction as described above. It also performs feature pre-processing, and cleaning steps, such as removing outliers, normalization, replacing empty values with mean values (data substitution), and so on. In this step, the data of Table 1 can be expanded as shown in example Table 2 below:

TABLE 2

| user_uuid | product_uuid | Feature Set | select |
|---|---|---|---|
| U1 | P1 | [F1, F2, F3 . . . F25] | 0 |
| U1 | P2 | [F1, F2, F3 . . . F25] | 1 |
| U2 | P1 | [F1, F2, F3 . . . F25] | 0 |

The user interaction data along with features as in Table 2 is used for training the model. That is, a binary value (0 or 1) indicating whether or not a user interacted with a product selection or not, e.g., selected a tennis racquet and not a baseball bat. The model training step can use a training dataset with all features. In this case, the process trains a gradient boosted machine model with loss function as binary logistic, where the model is a classifier. In an embodiment, the process uses hyperparameter tuning through grid search and then calculates feature importance using SHAP for all the features and is a two-step process that first trains a full model and then uses SHAP to get the most important features and train a second model, as described previously.

The process can alternatively use a training dataset with a partial number of features, that is, with a lesser number of features based upon the importance calculated from the model. This time the model is a LambdaMART model, which means that the loss function is a pair-wise rank. The accuracy metrics are analyzed, and the explore-exploit percentage for the next campaign is decided based upon these accuracy metrics. Explore percentage for the first iteration of the campaign is 100%. Once a LambdaMART model is trained, its accuracy is computed using the 20% test data. This accuracy is used to programmatically determine the explore percentage for subsequent runs of the client's campaign. An already accurate model might use 20% (for example) exploration in subsequent campaigns and a poor model might use up to 60% (for example) exploration in subsequent campaigns.

The process then uses the trained LambdaMART model to re-rank candidate products for a user in subsequent campaigns, 812. For example, if the user has tennis or racquet sports equipment as recommended candidates in the next campaign, the ordering of candidates would be changed by the model via inference to display items such as tennis balls, tennis shoes, racquetball racquets, and so on. To use the model for inference, i.e., reordering a list of candidate products for a user, the same user and product features are used to initially train the LambdaMART model. This time, the trained model reorders the list of products for the user.

In an embodiment, the trained model is used in an explore-exploit phase 805 that refines the product ranking for subsequent campaigns or subsequent iterations of the same campaign. Thus, the trained model can be effectively used for subsequent campaigns and fine-tune itself with fresh training data to adapt to changing user behaviors.

This trained model is used to re-rank the results by inference for a certain subset number of users, such as 80 million users out of 100 million total targeted users, i.e., 80% exploit. The results are randomized for the remaining users, i.e., 20 million users (or 20% explore) for this example, 814. In this manner, the product selection is still randomized to some degree and sent to a smaller set of users in a campaign, and the data from this users getting explored are used to retrain the model for next iteration along with older explore data, 816. The explore/exploit percentages (e.g., 80/20) are programmatically controlled based upon the accuracy of previously trained model. For the embodiment of FIG. 8, the feedback loop goes from step 814 to step 806 so that every time a new campaign runs, the system collects more data from the explore percentage of users to add along to the training set. Each model training still requires recreating the training data frame to accommodate the new data.

This process 800 effectively starts with an initial or random order of set products and uses product, user and user-product features to grow the feature table (e.g., Table 1) horizontally based on the number of times any user interacts with a product. The process trains an LTR model and re-ranks the products using the trained model to provide a new order or ranking of the products to the same or other users. The explore/exploit mode continues the re-ranking process based on randomization for smaller subsets of users, which provides useful feedback to the model training step.

Embodiments are described for a system that trains a classifier and a LambdaMART (LTR-based) model to accomplish learning to rank. A classifier can be used to predict probabilities of click on a set of products given a user (point-wise approach), and can re-rank by the predicted probability values. The LambdaMART model directly learns to rank one product over the other and the output scores do not have an intrinsic meaning, like that of a selection probability (pair-wise approach).

As described above, in an embodiment, system 100 processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 9:
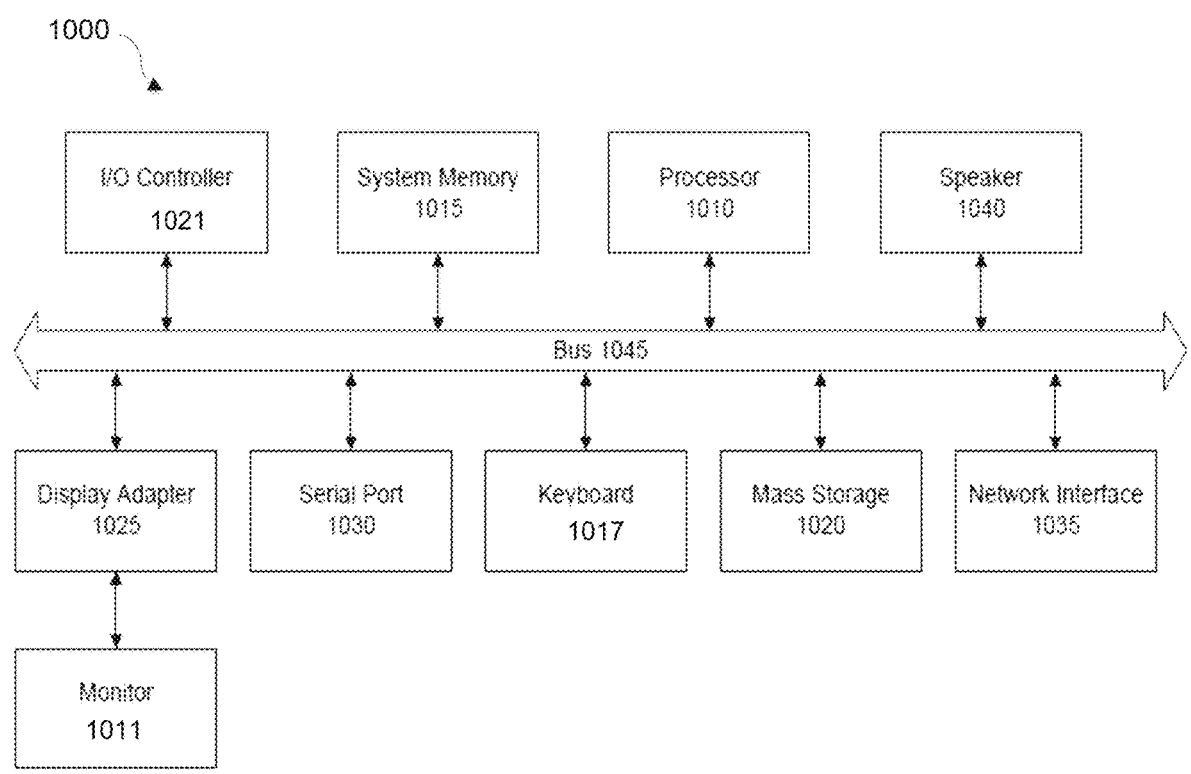
FIG. 9 is a block diagram of a computer system used to execute one or more software components of described methods, under some embodiments.

FIG. 9 is a block diagram of a computer system used to execute one or more software components of a system for performing some of the processor-based functions, under some embodiments. The computer system 1000 includes a monitor 1011, keyboard 1016, and mass storage devices 1022. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is but one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method comprising:
monitoring a communications medium between a user and one or more other users and one or more products for selection;
collecting data about the users, the one or more products in a sales campaign, and historical interactions among the users and the products from the monitored communications medium;
defining features pertaining to the collected data;
training a candidate ranking process using a LambdaMART model based on the defined features comprising: user catalog features including recency/frequency/magnitude (RFM) of a user's location, user timeline features including user activity counts, user campaign features including user historic click rates, product catalog features including product category information, product timeline features including product popularity, product campaign features including product historic click rate, user-product features including RFM of user interaction with a product or category, and user context features including historic user-product activities across all users and products in the sales campaign;

deploying the model to produce product recommendations for display to the user;

reducing the defined number of features to produce a selected feature set using a SHapley Additive explanations (SHAP) process in grouping comprising relevance of recommendation, user activity, product quality, product attribute affinity, and product fatigue;

retraining the model using the selected feature set and refreshed data based on user behavior to update the model for the user behavior.

2. The method of claim 1 wherein the communications medium comprises one of: e-mail, website portal, or text communications.

3. The method of claim 1 wherein the candidate ranking process ranks recommended products for selection by the user.

4. The method of claim 3 wherein the user activity comprises users selecting a product in the communication sent to the user through the communications medium.

5. The method of claim 1 wherein the recommendations comprise search engine results that are displayed in response to a query input by the user to a search engine process.

6. The method of claim 1 wherein the model is trained by features comprising at least one of textual, numerical time-series, audio, image, or video formats.

7. The method of claim 6 wherein the features comprise recency, frequency, and magnitude of user attributes, product attributes, and historical user-to-product interactions, and further wherein the recency is a time of the user's first and last interaction with a product, the frequency is a rate of user interaction in a defined time-frame, and the magnitude is a relative weight of the user interaction.

8. The method of claim 7 wherein the interactions comprise events on the user's application, web site, or communications medium, including user views, clicks, opens, and selections, and further wherein the user attributes comprise demography, location, age, device; and wherein the product attributes comprise description, price, category, brand, rating, and image.

9. The method of claim 1 further comprising using the user-to-product interactions as features for a subsequent training of the model and providing the subsequent training in a feedback loop to generate a larger dataset to adapt the model.

10. A computer-implemented method of implementing a sales campaign comprising:

collecting user-to-product interactions between a user and a product catalog over a communications medium, wherein the interactions comprises user initiated events including views, clicks, opens, and selections of a product in the product catalog;

defining user attributes including demography, location, age, device, and historical activity;

defining product attributes including title, description, price, category, brand, and rating;

generating a set of features based on a recency, frequency, and magnitude (RFM) of the user-to-product interactions, user attributes, and product attributes;

training a Learning-to-Rank (LTR) model using the generated features comprising: user catalog features including recency/frequency/magnitude (RFM) of a user's location, user timeline features including user activity counts, user campaign features including user historic click rates, product catalog features including product category information, product timeline features including product popularity, product campaign features including product historic click rate, user-product features including RFM of user interaction with a product or category, and user context features including historic user-product activities across all users and products in the sales campaign;

receiving a query in a search engine to return a list of results to the user, the list of results generated by an analysis engine using the model;

using present and future user-to-product interactions as features for subsequent trainings of the model and providing the subsequent trainings in a feedback loop to generate a larger dataset to iteratively adapt the model; and reducing the defined number of features to produce a selected feature set using a SHapley Additive explanations (SHAP) process in grouping comprising relevance of recommendation, user activity, product quality, product attribute affinity, and product fatigue;

retraining the model using the selected feature set and refreshed data based on user behavior to update the model for the user behavior.

11. The method of claim 10 wherein the features comprise recency, frequency, and magnitude of user attributes, product attributes, and historical user-to-product interactions, and further wherein the recency is a time of the user's first and last interaction with a product, the frequency is a rate of user interaction in a defined time-frame, and the magnitude is a relative weight of the user interaction.

12. The method of claim 11 wherein the model is trained and retrained using a cosine distance of user-context embedding and a product embedding, wherein the cosine distance between embedding vectors of products estimates a similarity between the products.

13. The method of claim 10 wherein the LTR model comprises a LambdaMART model.

14. The method of claim 10 wherein the communications medium comprises one of: e-mail, or website portal, or text communications.

15. A computer program product, comprising a non-transitory computer-readable medium having a computer-readable program code embodied therein, the computer-readable program code adapted to be executed by one or more processors to implement a method comprising:

monitoring a communications medium between a user and one or more other users and one or more products for selection;

collecting data about the users, the one or more products in a sales campaign, and historical interactions among the users and the products from the monitored communications medium;

defining features pertaining to the collected data;

training a candidate ranking process using a LambdaMART model based on the defined features comprising: user catalog features including recency/frequency/magnitude (RFM) of a user's location, user timeline features including user activity counts, user campaign features including user historic click rates, product catalog features including product category information, product timeline features including product popularity, product campaign features including product historic click rate, user-product features including RFM of user interaction with a product or category, and user context features including historic user-product activities across all users and products in the sales campaign;
deploying the model to produce product recommendations for display to the user;
reducing the defined number of features to produce a selected feature set using a SHapley Additive explanations (SHAP) process in grouping comprising relevance of recommendation user activity, product quality, product attribute affinity, and product fatigue;
retraining the model using the selected feature set and refreshed data based on user behavior to update the model for the user behavior.

* * * * *